No. 874,481. PATENTED DEC. 24, 1907.
C. E. BAKER.
FILTER OR SEPARATOR FOR PNEUMATIC CLEANERS.
APPLICATION FILED MAY 9, 1906.

3 SHEETS—SHEET 1.

No. 874,481.  
PATENTED DEC. 24, 1907.  
C. E. BAKER.  
FILTER OR SEPARATOR FOR PNEUMATIC CLEANERS.  
APPLICATION FILED MAY 9, 1906.

3 SHEETS—SHEET 2.

WITNESSES  
J. W. Angell  
W. W. Withenbury

INVENTOR  
Charles H. Baker  
by Charles W. Shires  
Atty.

No. 874,481. PATENTED DEC. 24, 1907.
C. E. BAKER.
FILTER OR SEPARATOR FOR PNEUMATIC CLEANERS.
APPLICATION FILED MAY 9, 1906.

3 SHEETS—SHEET 3.

WITNESSES
J. W. Angell
W. W. Withenbury

INVENTOR
Charles E. Baker.
by Charles W. Hills
Atty.

UNITED STATES PATENT OFFICE.

CHARLES E. BAKER, OF CHICAGO, ILLINOIS.

FILTER OR SEPARATOR FOR PNEUMATIC CLEANERS.

No. 874,481.  Specification of Letters Patent.  Patented Dec. 24, 1907.

Application filed May 9, 1906. Serial No. 315,874.

*To all whom it may concern:*

Be it known that I, CHARLES E. BAKER, a citizen of the United States, and a resident of the city of Chicago, in the county of Cook and State of Illinois, have invented certain new and useful Improvements in Filters or Separators for Pneumatic Cleaners; and I do hereby declare that the following is a full, clear, and exact description of the same, reference being had to the drawings, and to the letters of reference marked thereon, which form a part of this specification.

This invention relates to filters or separators for pneumatic cleaners of that class in which the dust laden air is drawn through a body of water before reaching the pump.

Heretofore in devices of this class it has been difficult to thoroughly separate the dust and dirt from the air before it reaches the pump, owing to the fact that the bubbles created by the air passing through the water carries a portion of the dust therethrough and deposits it in the pump cylinder causing it to become clogged and subjecting it to a considerable wear and causing frequent breakage.

It is important not only to prevent the dust reaching the pump cylinders but as well to make the device self cleaning while in operation thus avoiding the necessity for stopping to clean the machine.

The object of this invention is to provide a device adapted to thoroughly break up the air bubbles formed by the passage of the air through the water and to separate the dust therefrom thereby preventing it passing to the pump.

It is also an object of the invention to provide a device capable of being thoroughly and easily cleaned after use.

A further object of the invention is to provide a very cheap and simple filter adapted to be applied to cleaners as heretofore constructed if desired.

The invention consists in the matters hereinafter described and more fully pointed out and defined in the appended claims.

Figure 1:
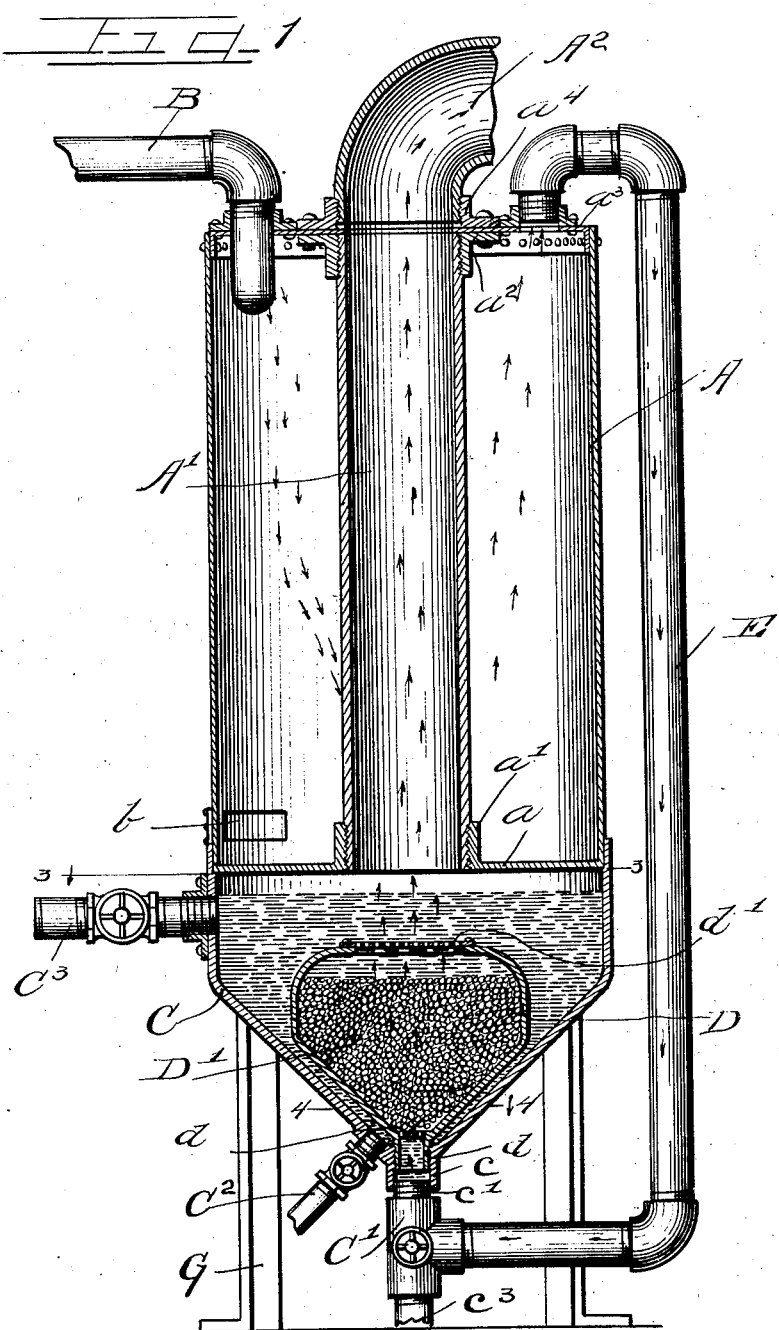
Figure 2:
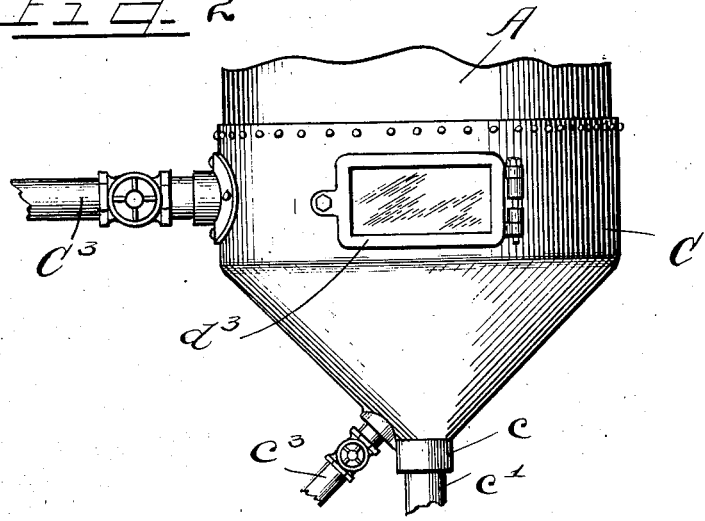
Figure 3:
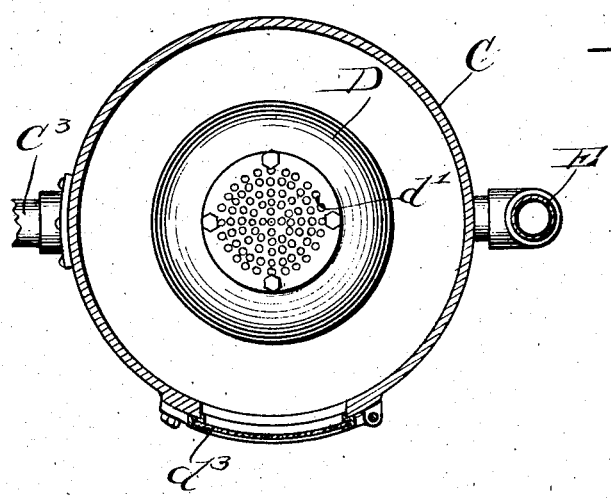
Figure 4:
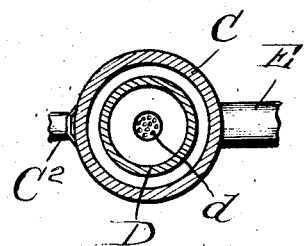
Figure 5:
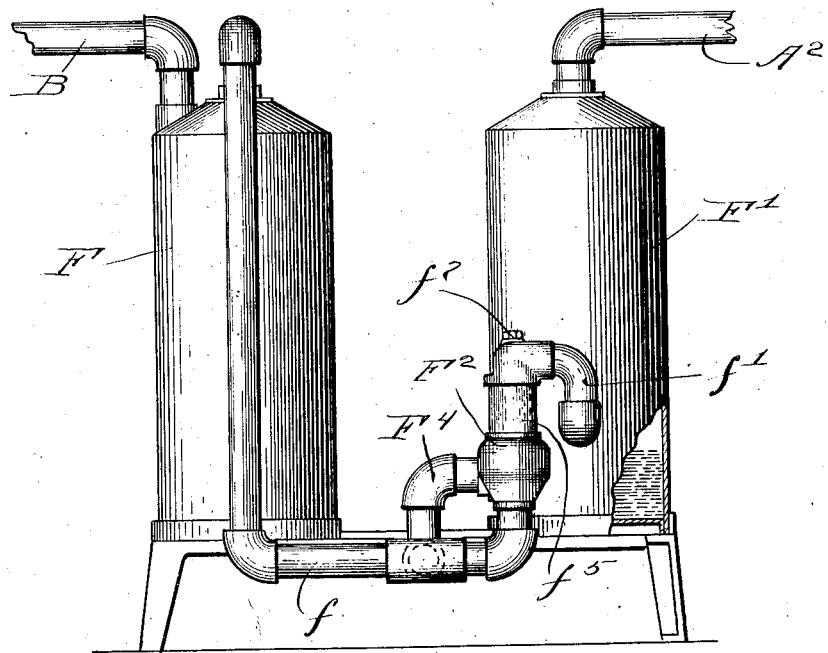
Figure 6:
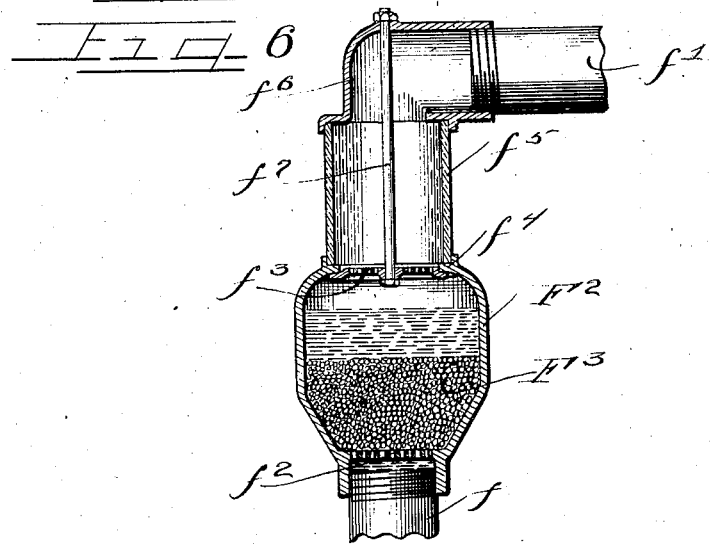

In the drawings: Figure 1 is a central vertical section of a device embodying my invention. Fig. 2 is a fragmentary side elevation thereof. Fig. 3 is a section taken on line 3—3 of Fig. 1. Fig. 4 is a section taken on line 4—4 of Fig. 1. Fig. 5 is a fragmentary side elevation of a cleaner having the dry and wet separators constructed separately and provided with a device embodying my invention. Fig. 6 is an enlarged vertical central section of the filter shown in Fig. 5.

As shown in said drawings: Referring first to Figs. 1 to 4 inclusive in which the wet and dry separating tanks are combined A represents the dry separator which comprises a shell of any desired material and construction and is provided with an axially apertured bottom $a$ therein having an upwardly directed internally screw threaded flange $a'$ surrounding said aperture. A pipe or tube $A'$ has threaded engagement at its lower end in said flange $a'$ and extends upwardly in the separator A, flush with the top thereof and having threaded engagement on the top of said pipe is a peripherally flanged collar $a^2$. A cover or head $a^3$ is rigidly engaged in the upper end of said shell and rests on said collar $a^2$ and is also provided with an axial aperture therethrough in register with the pipe $A'$.

A peripherally flanged, internally threaded collar $a^4$ is bolted, as shown, through the head $a^3$ and through the flange of the collar $a^2$ in axial alinement therewith. An exhaust pipe $A^2$ is rigidly connected in the flanged collar $a^3$ and leads to an air pump of any desired construction (not shown). A connecting pipe B opens through a suitable aperture in the head $a^3$ and leads to the vacuum cleaning device of any suitable construction and which also is not shown and adjacent the bottom of the shell is a door $b$ through which the accumulated material may be removed.

Supported upon a suitable frame is the wet separator or water tank C which as shown is shaped at its upper end to conform to the bottom of the shell A and in which said shell is rigidly engaged. The lower portion of said water tank C tapers downwardly forming an inverted cone, at the apex or lower end of which is a downwardly directed, internally threaded apertured boss $c$ in which is engaged a pipe $c'$ connected at its lower end with a three way valve $C'$. Said tank C as shown is provided near the bottom thereof with an aperture in which is engaged a valved outlet pipe $C^2$ by means of which the water may be drawn therefrom when cleaning the tank and at the top of said tank is a valved pipe $C^3$ opening thereinto by means of which the water is supplied to said tank from any suitable source.

A pipe E opens from the top of the tank A and leads downwardly and connects in the valve $C'$ thereby affording communication between the tank A and the receptacle C for the passage of air.

As the air is exhausted from the pipe or tube A' and the upper portion of the tank C, which is but partially filled with water, the air in the dry separator A is drawn through the connecting pipe E and passes upwardly through the water in the tank C. For the purpose of preventing dust laden bubbles of air passing through the water tank or wet separator C I have provided means for thoroughly breaking up the bubbles and washing the air comprising a retaining receptacle D which as shown is shaped at its lower end to conform to the bottom of said water tank C and is provided at its lower end with an apertured boss or pipe $d$ which has threaded engagement in the boss $c$ and supports said receptacle out of contact with the bottom and sides of the tank C. Said receptacle D as shown is provided with an aperture through the top thereof and over said aperture and rigidly engaged on the receptacle is a screen $d'$ of any desired material which together with a similar screen $d^2$ over the opening through the boss $d$ acts to retain within said receptacle any suitable granular material D' such as gravel or shot capable of breaking up the air bubbles.

In one side of the water tank C is provided a hand hole which is closed by a door $d^3$ which may be secured thereon in any desired manner but as shown is hinged to the side of the tank and is provided with a glass therein by means of which the height and condition of the water and the action of the machine may be ascertained.

In the construction shown in Figs. 5 and 6 the dry and wet tanks indicated by F and F' respectively are constructed separately and are connected by the pipe $f$ which as shown, opens from the top of the dry tank and leads downwardly beneath the same and upwardly and opens through the delivery end $f'$ thereof into the water tank F' above the normal level of the water. Connected in said pipe $f$ between its lowest point and the end $f'$ is an axially apertured receptacle F² similar to the receptacle D and which increases in size from its bottom upwardly and extends to a height somewhat above the normal level of the water in said tank F'. Said receptacle F² as shown is provided in its bottom with a screen $f^2$ and at the top thereof with a screen $f^3$ which act to retain the gravel or other granular material F³ therein though permitting the free passage of the water therethrough. Said casing F² as shown is provided at its top with an upwardly opening seat $f^4$ upon which is carried a tube or cylinder $f^5$ of transparent material, such as glass and which is connected at its top with the pipe end $f'$ by means of a suitable coupling $f^6$, through which and through the screen $f^3$ is a tie bolt $f^7$ which acts to rigidly bind said coupling, cylinder and screen $f^3$ in place.

The pipe F⁴ opens from the water tank F' below the normal level of the water therein and connects in the pipe $f$ below the receptacle F² and acts to supply water thereto.

The operation is as follows: Referring first to Figs. 1 to 4 inclusive the tank C having been filled to the desired depth with water and the air pump set in motion suction is produced in the pipe A' thereby drawing the air from the tank A and suction pipe through the pipe E and into the water tank C. The heavier material is deposited in the dry separator A and such of the lighter dust and material as may be drawn into the pipe E passes upwardly into the receptacle D. The force of the current created by the suction through the receptacle D causes the gravel or other material therein to be greatly agitated thereby breaking up any air bubbles and separating the dirt from the air before it escapes to the pipe A'. The water in the wet separator of course soon becomes very dirty and becomes almost a fine mud in the receptacle D but air pressure from below soon forces the dirt through the top of the receptacle and it settles to the bottom of the wet separator then to be drawn off through the pipe C², as clean water is admitted through the pipe C³ and without stopping the work.

When it is desired to clean the device after stopping the pump the water may be drawn from the water tank C by means of the valved pipe C² and from the receptacle D by means of the outlet or drain pipe $c^3$ connected in the bottom of the valve C' and when water is admitted through the flushing pipe C³ it acts to pass downwardly through said valved pipes C² and $c^3$ thereby washing the inner surfaces and cleaning the accumulated dirt from the gravel and screens.

In the construction shown in Figs. 5 and 6 the air passes from the dry separating tank F and through the pipe $f$ through the granular material in the receptacle F² thereby breaking up the bubbles and thoroughly separating the dirt from the air before it enters the tank F'. When it is desired to clean the device it is only necessary to remove the bolt $f^7$ thereby permitting the receptacle to be dis-connected from the pipe $f$ and thoroughly cleaned.

I claim as my invention:

1. In a device of the class described the combination with a fluid tank of a dry tank above the same, an exhaust passage opening from the wet tank and leading axially through the dry tank, a pipe affording communication between said tanks, granular material covered by water through which the air from said pipe passes to the exhaust passage, an air inlet pipe opening into the dry tank and a door in the side of the dry tank near the bottom thereof.

2. In a device of the class described the combination with a tank containing fluid, a removable receptacle in said tank affording a space between the same and wall of the tank and supplied with fluid from said tank, filtering material in said receptacle, a pipe supplying air to the receptacle from below, an exhaust passage through which the air from said receptacle passes and independent clean out pipes opening from the tank and receptacle.

3. In a device of the class described the combination with a dry separating tank of a water tank, a pipe connecting said tanks, an exhaust pipe extending through the dry tank and communicating with the wet tank, a receptacle rigidly engaged in the bottom of the wet tank, a screen on each end thereof and material contained within the receptacle and surrounded by water for breaking up the air bubbles passing through the same.

4. In a device of the class described the combination with a receptacle having water therein, of a water tank communicating with the top of the receptacle only, a dry tank, an exhaust passage leading from the water tank, a pipe communicating with the top of the dry tank and with the receptacle from below and granular material inclosed within the receptacle adapted by agitation thereof to thoroughly break the air bubbles to mix the particles of matter carried thereby with the water in said receptacle and to permit the escape of the air to the exhaust passage.

5. In a device of the class described the combination with a dry separating tank of a water tank supporting the same and filled with water, a pipe extending centrally through the dry tank and opening into the wet tank, means for conducting air from the dry tank through the water tank and into said pipe, finely divided material in said water tank covered by the water therein, and through which said air passes, said material adapted by agitation of the same to separate the dirt therefrom.

6. In a device of the class described the combination with a dry separating tank of a water tank partially filled with water, an air pipe leading from the dry tank and communicating with the water tank beneath the surface of the water, a receptacle having water therein through which the air from said pipe passes, means in said receptacle adapted to prevent dust passing through the water, a valve controlled outlet for said water tank and a valve controlled outlet for the receptacle.

7. In a device of the class described the combination with a dry separating tank of a water tank partially filled with water, an air pipe leading from the dry tank and opening into the water tank beneath the surface of the water, a receptacle in said water tank through which the air passes, granular material inclosed in said receptacle and a passage opening from the water tank through which the air passes.

8. In a device of the class described the combination with a water tank of a dry separating tank, a pipe connecting said tanks and adapted to deliver air into said water, a receptacle in said water tank through which the air passes, means therein adapted to separate dust from the air bubbles, and a pipe opening into said water tank and extending through the dry tank adapted to conduct the air from said water tank therethrough.

9. In a device of the class described the combination with a water tank partially filled with water, of a separating tank supported thereon, an exhaust pipe extending therethrough and opening at one end into the water tank above the water and connected at the other with exhausting means, a pipe connecting the bottom of the water tank with the top of the separating tank, a receptacle in said water tank, finely divided material therein and means for retaining said material in the receptacle while permitting free passage of air and water therethrough.

10. In a vacuum cleaning mechanism the combination with a dry separating tank, and a wet separating tank containing water of a valved pipe connecting the top of the dry with the bottom of the wet separator, an inlet pipe in the top of the dry separator, a water inlet at the top and an outlet at the bottom of the wet separator, an exhaust pipe connected with the top of the web separator and extending centrally through the dry tank, a removable receptacle rigidly engaged in the wet tank and granular material therein through which the air is drawn.

11. In a vacuum cleaning system the combination with an exhaust pipe of a tank connected therewith containing water, a downwardly tapering casing therein containing coarse granular material and adapted to communicate with said pipe, a screen in the top thereof, water inlet and outlet pipes for said tank and an inlet pipe opening into said casing beneath the granular material.

12. In a device of the class described the combination with a dry tank of a receptacle, a pipe opening from the dry tank and communicating with the receptacle from below, a water tank communicating with the top of the receptacle and adapted to supply water to the receptacle, granular material in said receptacle covered by the water adapted by agitation to break up air bubbles, and means retaining the granular material in the receptacle when agitated and at rest and permitting the dust laden air to pass into the receptacle and the purified air therefrom.

13. In a vacuum cleaning system the combination with a fluid tank, a threaded boss extending downwardly from the bottom of said tank, a receptacle in said tank and threaded into said boss, a dry tank, a pipe opening into the same, a pipe opening from the dry tank and communicating with said receptacle, an exhaust passage through which the air flows from the receptacle after passing through the water tank, material in the receptacle adapted to interrupt the air bubbles and to mix the material carried by the air with said water and an independent discharge pipe for said receptacle and water tank whereby either or both may be cleaned while the system is in operation.

14. In a vacuum cleaning device the combination with a water tank of a dry tank connected therewith, a pipe affording communication between said tanks, an exhaust passage opening from the wet tank axially through the dry tank, a door in each tank, a receptacle in the water tank, granular material therein adapted to thoroughly mix the air, water covering the granular material to collect the particles of matter from said air said granular material agitated by the air passing therethrough to aid in collecting the dust and means whereby either the receptacles or water tank may be cleaned in operation.

In testimony whereof I have hereunto subscribed my name in the presence of two subscribing witnesses.

CHARLES. E. BAKER.

Witnesses:
W. W. WITHENBURY,
WM. C. SMITH.